UNITED STATES PATENT OFFICE.

HENRY FUNNELL, OF HUNTINGTON, NEW YORK.

IMPROVED REMEDY FOR DISEASES IN TREES.

Specification forming part of Letters Patent No. 47,099, dated April 4, 1865.

*To all whom it may concern:*

Be it known that I, HENRY FUNNELL, of Huntington, in the county of Suffolk, in the State of New York, have invented a new and Improved Remedy for the Worm and Yellows of the Peach-Tree and the Black Knot on the Cherry and Plum Trees, of which the following is a specification.

The nature of my invention consists in combining whale-oil, soap, sulphur, oxide of iron, wood-ashes, soot, and lamp-black in certain proportions, to be applied to peach-trees to prevent the yellows, and also to prevent the attack of worms; likewise for the cure of black knot in plum and cherry trees.

The combination is made in the following proportions, viz: whale-oil, fifty one-hundredths, ($\frac{50}{100}$;) soap, ten one-hundredths, ($\frac{10}{100}$;) sulphur, ten one-hundredths, ($\frac{10}{100}$;) oxide of iron, eight one-hundredths, ($\frac{8}{100}$;) wood-ashes, ten one-hundredths, ($\frac{10}{100}$;) soot, ten one-hundredths, ($\frac{10}{100}$;) lamp-black, two one-hundredths, ($\frac{2}{100}$.) These ingredients are to be mixed together and applied to the trees as similar remedies are applied.

What I claim as my invention, and desire to secure by Letters Patent, is—

The combination of the hereinbefore-mentioned ingredients, for the purpose set forth, substantially in the proportions described.

HENRY FUNNELL.

Witnesses:
ISAAC ADAMS,
GEO. H. SHEPARD.